3 Sheets—Sheet 1.

F. WEGMANN.

MACHINES FOR CRUSHING MEAL.

No. 7,829. Reissued July 31, 1877.

*Witnesses:*
Floyd Norris
D. P. Cowl

*Inventor*
Federigo Wegmann
by Johnson and Johnson
Attys

3 Sheets—Sheet 2.

F. WEGMANN.

MACHINES FOR CRUSHING MEAL.

No. 7,829. Reissued July 31, 1877.

*Witnesses:*

Lloyd Norris

D. R. Cowe

*Inventor:*

Federigo Wegmann by Johnson & Johnson

Attys.

3 Sheets—Sheet 3.

F. WEGMANN.

MACHINES FOR CRUSHING MEAL.

No. 7,829. Reissued July 31, 1877.

Witnesses:
Floyd Norris
D. R. Cook

Inventor:
Federigo Wegmann
by Johnson & Johnson
Attys.

UNITED STATES PATENT OFFICE.

FEDERIGO WEGMANN, OF NAPLES, ITALY.

IMPROVEMENT IN MACHINES FOR CRUSHING MEAL.

Specification forming part of Letters Patent No. 182,250, dated September 12, 1876; Reissue No. 7,829, dated July 31, 1877; application filed April 26, 1877; patented in England, March 6, 1874, for fourteen years.

*To all whom it may concern:*

Figure 2:
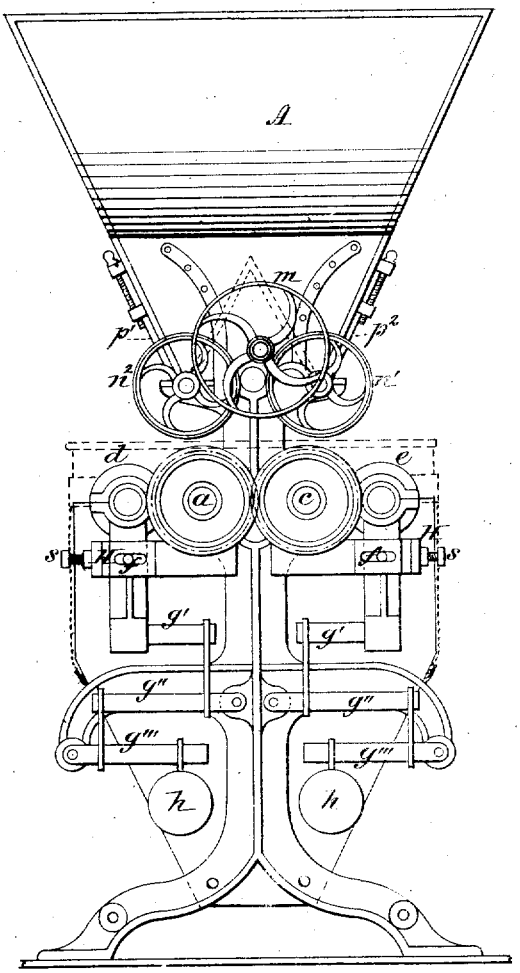
Figure 1:
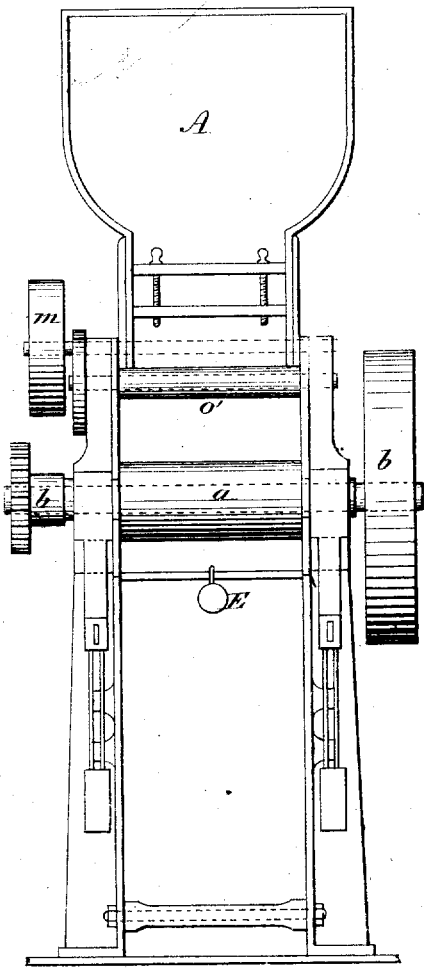
Figure 3:
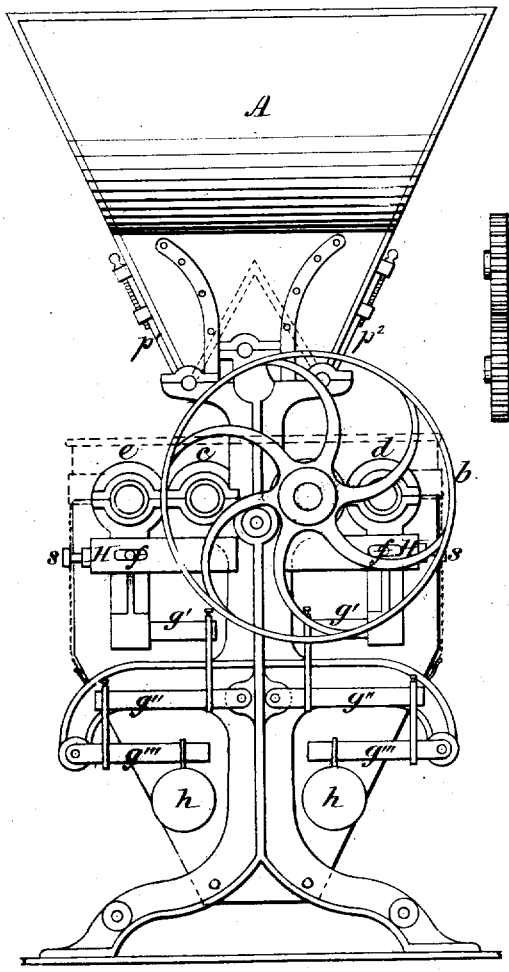
Figure 4:
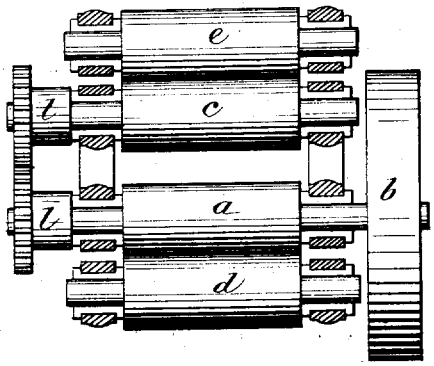
Figure 6:
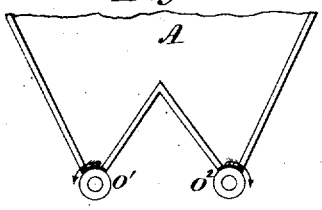
Figure 5:
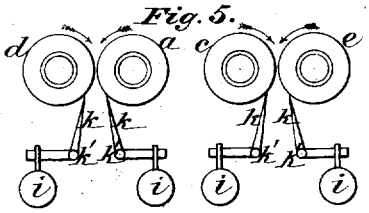

Be it known that I, FEDERIGO WEGMANN, of Naples, Italy, have invented a certain new or Improved Machine or Apparatus for Treating or Preparing Meal, of which the following is a specification:

Figure 1 of the accompanying drawings is a front elevation of my machine or apparatus. Fig. 2 is a side elevation. Fig. 3 is an elevation of the opposite side. Fig. 4 is a plan of the squeezing-rolls. Fig. 5 is a side elevation of the scrapers applied to the squeezing rolls, showing also the interposed non-conducting bed or layer between the china or porcelain and the iron core or shaft. Fig. 6 is a vertical cross-section of the hopper for the meal or flour which is to pass through the squeezing-rolls; and Fig. 7, a vertical cross-section of the machine, showing the relation of the supply-hopper with supplemental hoppers for the crushing-rolls.

This invention embraces, broadly, the combination, in a machine for preparing flour or meal, of crushing-rolls constructed with unbroken or smooth surfaces of porcelain or equivalent silicious substance; and the combination, in rolls for treating meal, of a porcelain surface, a metal core, and a non-conducting layer interposed between the metal and the porcelain, by which construction and combination I am enabled to obtain certain highly important results and advantages in the treatment of meal or flour.

*d a* and *c e* are duplicate pairs of porcelain or china coated rolls, of which *a* is driven by strap on the strap-pulley *b*. The roll *c* receives motion from the spindle of the roll *a* through wheel-gearing, as shown in Fig. 4. I find from two hundred and fifty to three hundred revolutions per minute a suitable speed.

Figure 7:
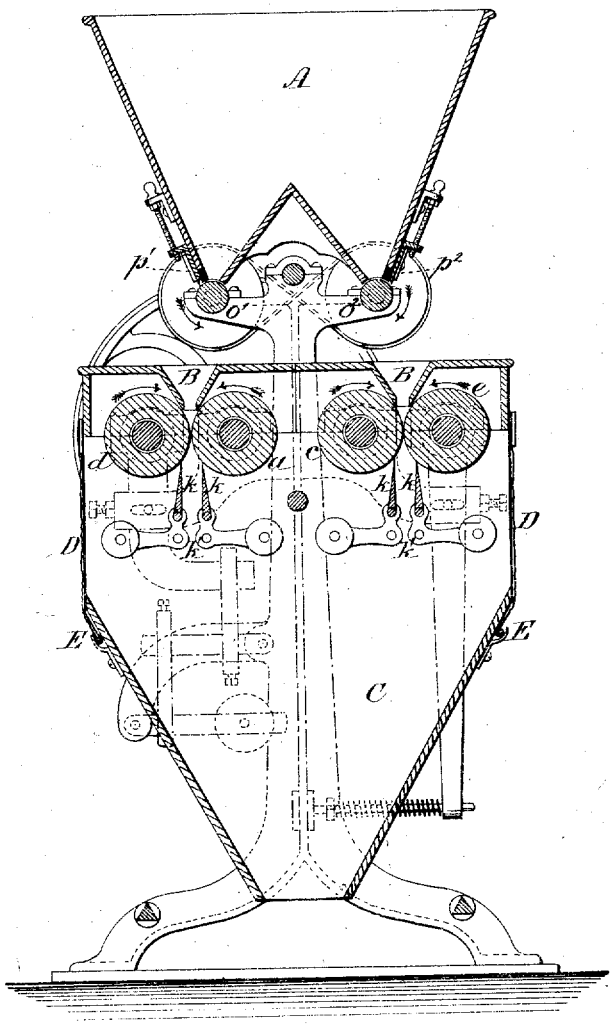

The rolls *a* and *c* have the bearings of their spindles in the framing of the machine, as shown; but the rolls *e* and *d* have their spindle-bearings in movable levers, having each their fulcrum, at H, on the point of an adjusting-screw, *s*, and are supported by pins *f* in slots, which permit an adjustment of said pins and their levers forward or backward, and by means of levers *g' g'' g'''* and weights *h*, or by a lever actuated by a spring, as shown in Fig. 7, are made to press the rolls *d* and *e* respectively against the rolls *a* and *c*, causing them to receive like revolving speed, and enabling substances harder than the coarse meal, which is to be squeezed, to pass through whole, because in such cases the rolls will open more. The coarse meal thus comes out in small flat cakes of the required fineness, which is regulated by the weights *h*, according to the consistency of the coarse meal and the quantity of same passing through the rolls.

The levers which bear the spindles of the rollers *d e* are supported by pins *f* resting in slots in the frame, and have their fulcra upon the points of the screws *s*, whereby the pressure of the rollers *d e* may be regulated without shifting the position of the weights *h* or their equivalent springs.

Fig. 5 shows the arrangement of the scrapers for scraping off the meal which may adhere to the rolls.

The scrapers *k* turn each at a fulcrum, *k'*, and are, by means of lever-and-weight appliances *i*, pressed against the rolls with any required pressure.

The parts of the scrapers which come in contact with the rolls I prefer to make of glass or similar wear-resisting material. These scrapers are mounted in their levers so as to be self-adjusting, which, in relation to the self-adjusting rolls, is of special advantage, as the contact of the scraper with the roll is thereby rendered constant.

The spindles of the rolls *a* and *c* also carry two strap-pulleys, *l*, Fig. 4, one of which, by strap, moves the strap-pulley *m*, the spindle of which has a tooth-pinion gearing with another pinion, which again gears into two larger toothed wheels, $n^1$ and $n^2$, thereby giving motion to the wooden feeding-rolls $o^1$ and $o^2$, Fig. 6, which are arranged at the angles of a double-incline-bottomed supply-hopper, A, so as to allow the meal to issue from regulated openings, as indicated by the arrows.

$p^1$ and $p^2$, Fig. 3, are two slides, adjustable by means of screws, for regulating the quantity of meal to pass from the hopper.

These feed-rolls $o^1$ and $o^2$ are arranged above the rolls *a* and *c*, in positions to deliver the meal between the crushing-rolls; and to accomplish this, supplemental hoppers B B are arranged to cover the crushing-rolls, being mounted for that purpose upon the box C, secured between or upon the frame-standards. These supplemental hoppers extend in close proximity to, and deliver the meal directly between, the crushing-rolls, and, besides, serve to protect them from dirt and dust.

At their outer edges these hoppers are provided with curtains D, which serve to close the open sides of the receiving-box C, and allow access thereto for examination of the meal or flour as it passes from the crushing-rolls. Catches or fastenings E serve to confine the curtains to the sides of the box, as shown in Fig. 7.

These supplemental hoppers and their curtains are made removable for ready access to the crushing-rolls when desired.

The meal is delivered from the supply-hoppers over the feed-rolls in a sheet, and falls down into the supplemental hoppers, the space between the two hoppers being unobstructed, which serves to cool the meal issuing from the feed-rolls. These feed-rolls may be operated by bands from the crushing-rolls, in any suitable way.

The smoothed, pressed meal passes from the crushing-rolls either to an Archimedean screw or into a box, and is, after intense sifting, at once turned partly into flour ready for use, and partly, without any further operations, as heretofore, into clean fine bran.

The machine will only work quietly and with satisfactory results when the squeezing-rolls are exactly cylindrical, as hard as possible, and very finely polished, constructed with porcelain or china surfaces.

I have found chilled cast-iron somewhat suitable; but even that in time gets out of truth and loses its fine surfaces. Metal altogether is not suitable, because the flour gets colored by it. I therefore prefer to coat the rolls with china or porcelain lining, put onto the iron rolls with putty, and finely turned with diamond tools.

I am aware that grinding-surfaces have been commonly composed of material containing so much silica that the flour will not be discolored; but there is a material difference between the action of grinding and crushing surfaces. The former depends upon the rough and broken condition of the surface called the "millstone-dress," whereby the cells and fibers are torn asunder, while the latter depends upon the smoothness and polish of crushing-surfaces, whereby the cells and fibers are crushed and broken down, and for this purpose the china or porcelain rolls have been found to give the best results and most important advantages.

The principle adapted is that of a squeezing action, instead of the tearing action now used under millstones for the reduction of middlings into flour.

This principle is not new, as cast-iron or steel rollers have been used for the purpose, and adapted to each other by bearings adjusted by set-screws. However, such machine did not achieve a perfect reduction of the granular particles (middlings or semolina) into flour. Moreover, owing to the want of an equal porous surface, the meal coming from these rolls was caked, and could not be easily sifted without undergoing a further disintegrating process before being ready for sifting, which process spoiled the beneficial squeezing action of the pressing-rollers by rubbing the flattened bran particles into meal. Then the surfaces of these rollers were constantly liable to be injured by nails and other hard substances passing between them, and much power was absorbed in driving them, so that iron rollers for treating middlings are not desirable.

The peculiar porous surface of the porcelain rolls is of vital importance, and, owing to their peculiar action, produce a very superior quality of flour, and the baking quality is raised by the perfectly-cool grinding and the granular shape of the flour, which also gives a superior quality of flour, both in color and strength.

There is no perceptible wear in the porcelain rolls for years, the diamond alone being able to cut the surface.

These rolls admit of continuous working action, as no loss of time is incurred by stone-dressing, &c. They give great safety as regards fire, as no heating occurs should the rolls run empty, while by their use a great saving of motive power is effected. These rolls effect a complete separation of the bran, the germ, and the membrane particles. The flour itself is finally ground pure and ready for use, while, by the separation and flattening of the cells containing the cereals, the flour so produced will not, even during fermentation, loose its color; wherefore it is suitable for export and for storing.

By the use of these rolls I am also enabled to obtain flour of a very fair quality out of middlings or sharps, which could not be advantageously ground by millstones or treated by iron rolls, owing to their low qualities.

I have stated that I prefer to coat the rolls with china or porcelain lining put onto iron rolls with putty, and finely turned with diamond tools. I mean by this that the crushing-surfaces of the rolls are of china or porcelain, rendered perfectly smooth and true by being turned with diamond tools to reduce the surface to true cylinders; and that such china or porcelain coating is put onto a metal core by an interposed non-conducting bed, as shown in Fig. 5.

The object of this is to combine, in rolls for treating meal on porcelain surfaces, a metal core or shaft and a non-conducting layer or bed interposed between the metal and the porcelain coating. This interposed bed is a non-conductor of heat within certain limits. It also forms a base almost free from expansion and contraction. It is very slow to give off acquired heat, or to acquire it. It deadens the transmission of vibrations or shocks. It forms a perfect medium as between the unequal contraction and expansion of the metal core and the porcelain coating or cylinder. It is within certain limits elastic, and is an important element, in connection with porcelain-surfaced rolls, for crushing meal to increase the yield of flour.

I claim—

1. The combination, in a machine for preparing flour or meal, of crushing-rolls constructed with unbroken surfaces of porcelain or equivalent silicious substance.

2. One or more rolls *a*, and corresponding rolls *d*, the latter being supported on pins *f*, resting in slots, and fulcrumed upon the points of adjusting-screws *s*, and pressed against the former automatically, substantially as and for the purposes set forth.

3. In a machine for preparing flour or meal, and in combination with the other operative members thereof, the crushing-rollers *a d*, constructed with unbroken surfaces of porcelain or other equivalent silicious substance, for the purpose set forth.

4. The combination, in rolls for treating meal, of a porcelain surface, a metal core, and a non-conducting layer interposed between the metal and the porcelain, all substantially as and for the purpose set forth.

5. The scrapers *k k*, constructed of glass or other similar substance, in combination with their carrying and adjusting appliances and the crushing-rolls.

6. The combination, with the self-adjusting crushing-rolls, of self-adjusting scrapers, adapted thereto.

7. The combination, with meal-crushing rolls of porcelain or other equivalent silicious substance, of scrapers of glass or other similar substance, for the purpose described.

8. The supply-hopper A, the feeding-rolls $o^1$ $o^2$, and the adjustable slides $p^1$ $p^2$ at the angles of the double-inclined bottom thereof, the crushing-rolls *d a* and *c e*, and the supplemental hoppers B B, interposed between the feeding and the crushing rolls, whereby the meal is delivered in regulated sheets by regular roll-feed into hoppers arranged above the crushing-rolls.

9. A machine for crushing meal or flour, consisting of a supply-hopper with feed-rolls, self-adjusting crushing-rolls of porcelain or china, supplemental hoppers adapted thereto, and self-adjusting scrapers for the crushing-rolls, all constructed and adapted for operation as herein set forth.

In testimony whereof I have hereunto set my hand in the presence of two witnesses.

FR. WEGMANN.

Witnesses:
H. MILLER,
W. MEYER.